E. Stebbins.
Stop Cock.
No. 3,341. Reissued Mar. 23, 1869.
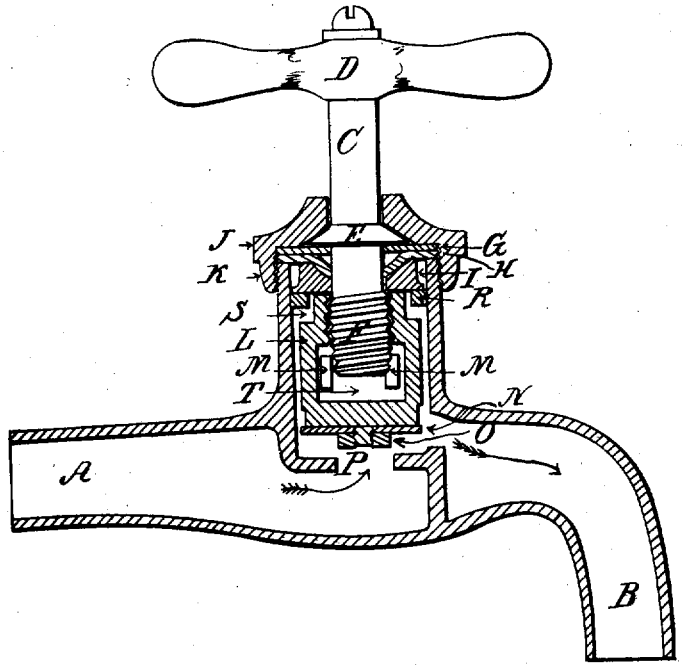
Witnesses;
Edward W. Bliss
Jerry W. Bliss
Inventor;
Erastus Stebbins
N. PETERS, PHOTO-LITHOGRAPHER, WASHINGTON, D. C.

UNITED STATES PATENT OFFICE.

ERASTUS STEBBINS, OF CHICOPEE, MASSACHUSETTS.

IMPROVEMENT IN STOP-COCKS.

Specification forming part of Letters Patent No. 23,721, dated April 19, 1859; Reissue No. 868, dated December 20, 1859; Reissue No. 3,311, dated March 23, 1869.

*To all whom it may concern:*

Be it known that I, ERASTUS STEBBINS, of Chicopee, in the county of Hampden and Commonwealth of Massachusetts, have invented certain new and useful Improvements in Cocks for Fluids; and I do hereby declare that the following is a full and exact description thereof, reference being had to the accompanying drawings, making a part of this specification, and to the letters of reference marked thereon.

My invention relates to the construction of that class of fluid cocks or faucets in which plug-valves are used, which valves are screw-threaded and are worked to and from the valve-seats by rotary stems.

My improvements have reference to the details of construction by which the liability of such cocks to leak is practically overcome, and also to details of construction tending to lessen the cost of such cocks.

The improvement consists, primarily, in combining, with a valve-passage made through a partition dividing the induction and eduction passages, a valve-nut, which works in a chamber made in the neck of the cock, such nut being moved to and from the valve-seat by the rotation of the stem or spindle, and having means to prevent its rotation.

The invention also consists in combining directly with the neck or neck-chamber of the cock the means for preventing rotation of the valve in its movements to and from the valve-seat.

The invention further consists in chambering the valve-nut to facilitate the formation of the screw-thread therein and to admit the fluid to such thread for lubrication thereof.

The invention further consists in combining, with the valve-chamber, sliding valve-nut, and rotary valve stem or spindle, a collar or shoulder fixed or cast upon or with the valve stem or spindle, with a washer placed between the stem collar and cap and the top of the faucet-neck, and a loose collar around the spindle between the washer and the top of the valve-nut.

The drawing represents the interior arrangement of the parts of a faucet or fluid-cock embodying my improvements.

A denotes the induction, and B the eduction-pipe, separated by a partition, through which is the valve passage P, said partition forming the seat for the valve L. This valve plays in a chamber, S, formed by the neck of the faucet, and it is made as a nut, or with an interior screw-thread, into which works a screw-thread, F, formed on the lower end of the valve-operating spindle C, which spindle may be surmounted by a handle, D, as seen in the drawing. The spindle is formed with a shoulder or collar, E, the bottom of which rests upon a washer, G, placed between the top of the faucet-neck and the cap J, as seen in the drawing, the top surface of the collar bearing against the bottom surface of the cap, the washer G, and cap J, thus keeping the valve-spindle in position, or from vertical movement, when the spindle is rotated. The valve-nut O is cast or formed hollow, or with a chamber, T, from which chamber lateral passages M open outward, this construction saving in weight of material, affording room for movement of screw-tap and for exit of chips made in cutting screw-thread, and providing passages for entrance of fluid from valve-chamber to the screw-threads for lubrication. The valve L is so constructed or arranged as to be incapable of rotation with the screw-spindle, it being for this purpose preferably formed polygonal in cross-section, and the walls of the valve-chamber being correspondingly formed so that as the valve turns its corners meet the faces of the walls, which arrest such rotation, these means for preventing rotation of the valve forming a direct part of the faucet-neck, and not being furnished by an adjunctive device. The bottom of the valve is surfaced by an elastic packing secured to the valve by a suitable screw-nut, O, this packing rendering the valve-opening impervious when the valve is forced hard down upon its seat by turning the valve-spindle C. The faucet is surmounted by a screw-cap, J, and the valve-spindle passes through the center of this cap, and as fluid under pressure when the faucet is open fills the valve-chamber and has a tendency to press out through the joints between the cap and the spindle, and the cap and the faucet-top, provision is necessary or important for preventing such leakage; and, to make the top of the faucet-neck tight, an elastic or flexible washer, H, is interposed between the cap J and the top of the faucet, screwing down the cap, creating pressure upon this washer against the top of the faucet, and thereby tightening this joint. Now, to pack the joint at the spindle, I extend this washer H to the spindle, or make the washer from a disk, cutting a central hole through the disk for passage of the spindle, and place beneath the washer or between the washer and the nut a loose metal collar, I, having such thickness that when the nut is drawn up from the valve-seat, it (the nut) shall press against the loose metal collar, driving the edge which immediately surrounds the spindle up tight against the spindle, so that no fluid can escape there. The metal collar I is preferably made with a conical recess, as seen in the drawing, the center of the washer being crowded down into the recess so that when the collar is forced upward it shall have a more direct tendency to press the washer against the spindle.

The cap J and collar I may also be relatively so constructed that the upward pressure of the nut also forces the washer against the bottom surface of the cap (or against the interposed metal washer G) and thereby aids in tightening the joint between the cap and faucet-neck.

When the valve-nut is forced down, away from the loose collar I, said collar drops and rests upon a seat, R, projecting inward from the wall of valve-chamber S.

I claim—

1. In combination with the valve-spindle C and valve-seat P, the chambered valve-nut L, having orifices M, substantially as shown and described.

2. In combination with the rotating screw-spindle C and its reciprocating valve-nut L, the metal washer I and flexible washer H, arranged to operate substantially as described.

3. The relative construction and arrangement of the metal collar I, flexible washer H, and metal washer G, substantially as shown and described.

4. In combination with a flexible washer, a metal collar formed with a recess adjacent to the valve-spindle and extending outward therefrom, by which recess the collar is caused to pack the washer tightly around the spindle when pressed against the washer, substantially as shown and described.

In witness whereof I hereunto set my hand this 22d day of July, A. D. 1867.

ERASTUS STEBBINS.

Witnesses:

JAPHET CHAPIN,

J. P. BUCKLAND.